March 16, 1971   H. BENDER   3,570,046
APPARATUS FOR SHIRRING ARTIFICIAL SAUSAGE CASINGS
Filed Dec. 26, 1968
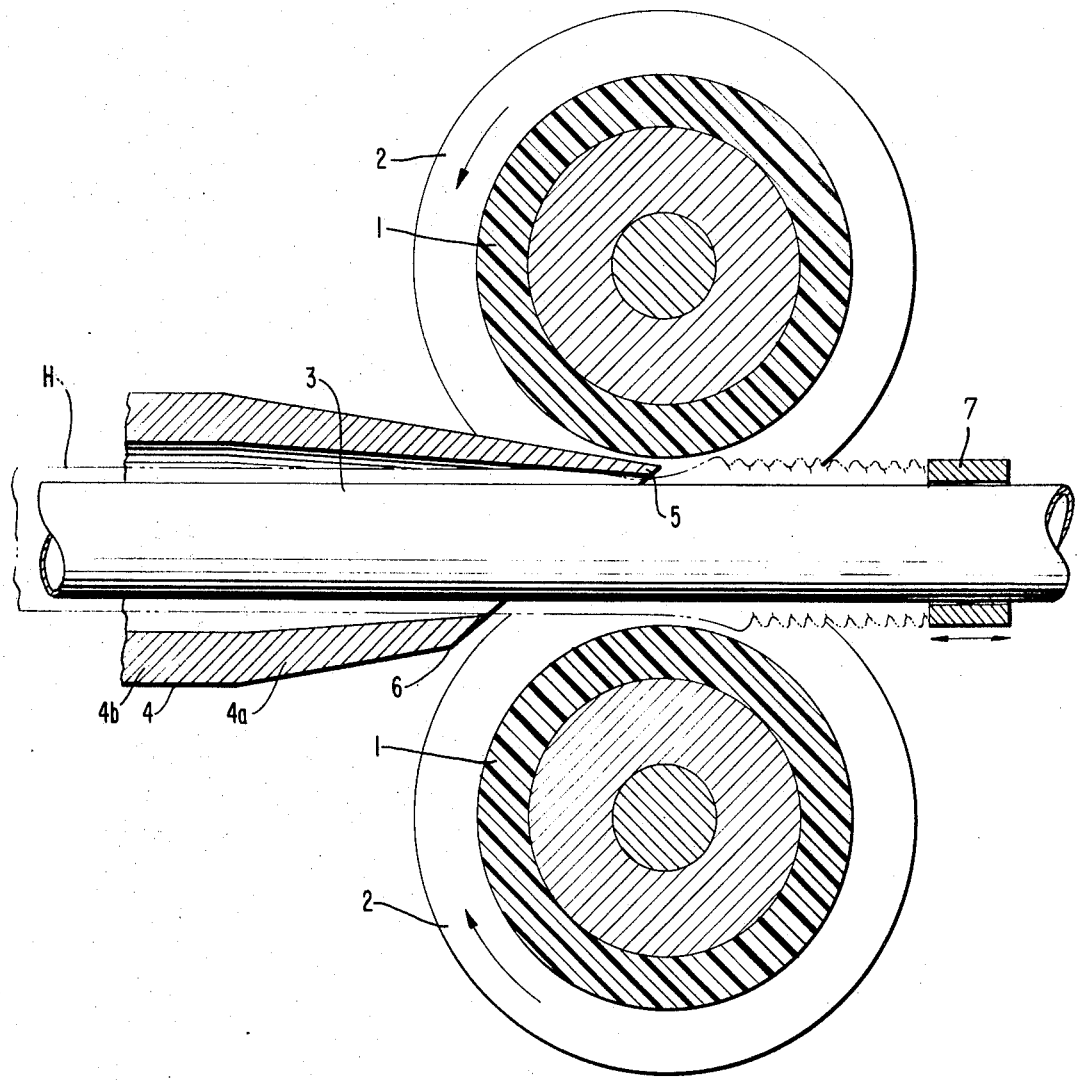
INVENTOR
HUGO BENDER
BY
Bryan and Butrum
ATTORNEYS – # United States Patent Office 3,570,046
Patented Mar. 16, 1971

3,570,046
APPARATUS FOR SHIRRING ARTIFICIAL SAUSAGE CASINGS
Hugo Bender, Wiesbaden-Erbenheim, Germany, assignor to Kalle Aktiengesellschaft, Wiesbaden-Biebrich, Germany
Filed Dec. 26, 1968, Ser. No. 787,071
Claims priority, application Germany, Dec. 27, 1967,
P 16 32 114.5
Int. Cl. A22c 13/00
U.S. Cl. 17—42                                                3 Claims

ABSTRACT OF THE DISCLOSURE

This invention relates to an apparatus for shirring sausage casing which comprises a mandrel, a movable abutment adapted to be contacted by the end of a shirred casing, a plurality of rotatable conveyor wheels mounted adjacent the mandrel and being adapted to engage a sausage casing, and a rotatable sleeve on the mandrel in front of the conveyor wheels, the sleeve having a tapered section adjacent the conveyor wheels and an oblique end.

---

Artificial sausage casings, in particular those of regenerated cellulose, are frequently given a shirred shape, because they can be easily handled when deformed in this manner.

Most of the known apparatuses for shirring artificial sausage casings are provided with a hollow mandrel with conveyor means arranged around the mandrel and with an abutment whose distance from the conveyor means is variable. For shirring, the sausage casings are transported in the longitudinal direction by the conveyor means, drawn onto a section of the mandrel and from there, after having passed the conveyor means, pushed onto an adjacent section of the mandrel, until the transport is ended, with pleating of the sausage casing, either by the abutment or by the already pleated lengths of casing piled up in front of the abutment. This pleating of the sausage casings with simultaneous reduction of length, which takes place under relatively heavy pressure, is designated in the following as "shirring."

Since the quantity of shirred sausage casings piling up before the abutment increases steadily during the shirring operation, the abutment is allowed to move back from the conveyor means during shirring at the rate of which the quantity of shirred sausage casing piled up in front of the abutment increases in length. As soon as the shirred sausage casing has reached the desired length, the shirring operation is interrupted to allow the shirred portion of the sausage casing to be cut off from the remainder of the sausage casing and for the shirring mandrel loaded with shirred sausage casing to be freed therefrom or be replaced by an empty shirring mandrel. Before shirring is resumed, the abutment is returned to its initial position nearer the conveyor means. These two possible movements of the holdback surface, i.e. its movement away from the conveyor means during shirring and its return to the initial position thereof, are meant when stating, in this context, that the distance of the abutment from the conveyor means is variable.

During shirring of the sausage casing, air is blown, under a pressure which is slightly above atmospheric pressure, through the hollow mandrel and into the interior of the sausage casing, so that the casing is inflated to its full size while it is being drawn and pushed over the shirring mandrel and shirred. The inflated section of the sausage casing may be bounded, e.g., on one side by the abutment and on the other side by a pair of squeeze rolls which pinch the sausage casing before it reaches the shirring mandrel. However, the inflated section of the sausage casing also may be enclosed in any other suitable manner. Also, it is not necessary for the boundary points to cause a perfectly air-tight closure of the sausage casing, since the slight superatmospheric pressure required can be maintained by a continuous blowing in of air. Therefore, the boundary means are not described in the present application. Their construction is no part of the invention described in this application.

In order to effect shirring in a technically advantageous manner, it has been suggested to use two or more endless revolving rows of shirring cogs as conveyor means which cause the shirring of the sausage casing by compression on the mandrel, part of each revolving row of shirring cogs conveying the sausage casing by engaging the latter with the cogs with partial compression of the casing while being moved in the direction of feed of the sausage casing. The rows of cogs are mounted around the mandrel at equally spaced distances, i.e. in the case of two rows they are positioned on opposite sides of the casing, in the case of three rows they are spaced around the central axis of the mandrel at angles of 120°, and so on.

In an early embodiment of the just described known type of shirring machines, two rows of shirring cogs were used, of which the cogs were spaced at a relatively large distance from each other, as compared with the diameter of the sausage casing, and engaged the sausage casing simultaneously from opposite positions on the circumference of the latter. In a more recent, improved version of the shirring apparatus of this type, two or more rows of shirring cogs acting on the sausage casing with deformation thereof were mounted around the mandrel in such a manner that the distance between successive shirring cogs corresponded approximately to the length of the shirring cogs, measured in the longitudinal direction of the sausage casing, and the shirring cogs of one row were staggered with regard to the shirring cogs of the other row, so that the sausage casing was never simultaneously engaged by shirring cogs on opposite sides of its circumference, and caused to move in the longitudinal direction.

In other known shirring apparatuses, the conveyor means consist of two wheels with grooved rims which are mounted at opposite positions in such a manner that the sausage casing is continuously clamped between them and is continuously advanced by the two wheels which rotate in opposite directions. For improved pleat formation, the wheels perform a reciprocating or otherwise periodic movement in relation to the mandrel.

The above described shirring apparatuses of known type or of a relatively complex construction.

The present invention provides a shirring apparatus which can be built relatively easily, but nevertheless has a good shirring action, so that sausage casings shirred with this device form a stick of relatively high bending resistance.

The present invention is based on a known machine for shirring artificial sausage casings in which two or more conveyor wheels with rims grooved in accordance with the diameter of the sausage casing are mounted around a stationary hollow mandrel with their axes at right angles to the mandrel and in which an abutment surface is positioned at a variable distance from the conveyor wheels. A rotatable sleeve surrounds a section of the mandrel in front of the conveyor wheels and the section thereof approaching the conveyor wheels is tapered and has an oblique end. The sleeve, advantageously, also has a cylindrical section on a portion thereof which is remote from the conveyor wheels.

The apparatus is provided with two or more conveyor wheels mounted at equal spaced distances around the mandrel, which continuously retain the sausage casing clamped between them during operation of the machine and cooperate to give it an advancing movement, by means of which the sausage casing is drawn or pushed onto the mandrel in the manner described above and simultaneously shirred.

The essential feature of the machine is the rotatable sleeve which is mounted in front of the shirring wheels and surrounds the mandrel so that the sausage casings to be shirred, before passing between the conveyor wheels, are surrounded by the sleeve.

The sleeve is tapered in the direction of the conveyor wheels and bevelled at the end. The inside diameter of the sleeve is such that it initially is larger than the diameter of the sausage casing inflated with air, so that the casing can run into the sleeve without touching it. But, at the other end, the sleeve is narrowed so that the projecting end of the bevelled section engages the sausage casing, which is deflected from its straight path and leaves the sleeve unsymmetrically, and thus unsymmetrically runs into the shirring wheels. The advantageously present cylindrical section of the sleeve is on a section removed from the conveyor wheels so that, in the presence of a cylindrical section, the sausage casings run into this section and then pass into the narrowed section. The inside diameter of the cylindrical section is larger than the diameter of the sausage casing inflated with air so that the sausage casing can run into the cylindrical section without touching it. The bevelled section of the sleeve is so constructed with regard to bevelling and narrowing that the sleeve, at the point where it has the smallest length due to bevelling, has a diameter which is not smaller than the diameter of the inflated sausage casing.

The sleeve is rotatable about its axis and is connected with a drive means whereby it can be rotated about its axis. The drive speed for rotation of the sleeve need not depend on the speed at which the conveyor wheels are driven. Advantageously, both drives are independently adjustable with respect to each other.

The sleeve may be produced from a rigid plastic material, e.g., from unplasticized polyvinyl chloride. More suitable, however, is a sleeve with a polished metal surface, e.g., a sleeve of chrome-plated polished metal.

The machine of the present invention has the advantage that it is of a very simple construction and can be operated in a variable manner.

The invention will be further illustrated by reference to the accompanying drawing showing, partially in section, the features of a shirring machine of the invention.

The machine includes, as conveyor means, two conveyor wheels 1 which are stationary relative to a shirring mandrel 3 and can be rotated, by means not shown, in opposite directions, as indicated by the arrows. The conveyor wheels 1 are both provided at their rims with grooves 2 of such a shape that, at a suitable distance of the two conveyor wheels 1 from each other, the sausage casing H to be shirred is received in the grooves 2 without any deformation visible to the naked eye, but is held so tightly in the grooves 2 that the conveyor wheels 1 advance it during their rotation without any slippage between the conveyor wheels 1 and the sausage casing H. The conveyor wheels 1 are fabricated from a material having desired surface characteristics, particularly a plastic material, such as unplasticized polyvinyl chloride, hard rubber, or plastic materials resembling hard rubber.

The mandrel 3 is mounted in the center between the conveyor wheels 1. It is hollow so that air can be blown into the sausage casing.

As can be seen from the direction of rotation of the wheels 1, indicated by the arrows, the sausage casing in the illustrated machine is conveyed by the rotation of the wheels from left to right towards a movable abutment 7. With reference to the conveying direction, a sleeve 4 surrounding the mandrel 3 is mounted in front of the conveyor wheels 1. The sleeve has a tapered portion 4a and is bevelled at its end in front of the shirring wheels. The remaining section of the sleeve, i.e., section 4b remote from the conveyor wheels, is cylindrical. Section 5 of the sleeve end which, due to bevelling, is the section of maximum projection, is positioned so close to the mandrel, because of tapering of the sleeve, that the sausage casing H is deflected from its previously straight longitudinal movement in the direction of the shirring mandrel. Section 6 of the sleeve end which, due to bevelling, is the least projecting section, however, permits unhindered straight longitudinal movement of the casing. In the illustrated embodiment, the maximum projecting section 5 of the oblique sleeve end projects into the point of the narrowest passage between both conveyor wheels. Such an arrangement of the sleeve is possible but not necessary. It is sufficient if the maximum projecting section 5 is positioned so close to the conveyor wheels 1 that the deflection given thereby to the sausage casing is still effective when the sausage casing is contacted with the grooves 2 of the conveyor wheels 1.

The most favorable speed at which the sleeve is rotated depends on the speed of the sausage casing in the longitudinal direction, its diameter, on the wall thickness of the sausage casing and on its plasticizer and moisture content. In addition to its simplicity, the machine in accordance with the invention has the advantage that pleat formation during shirring can be periodically influenced, this periodicity being independent of the length of the sausage casing conveyed during one period. The most favorable speed of rotation of the sleeve, generally, is such that the sleeve performs one revolution while the sausage casing is advanced 2 to 10 cm.

It will be obvious to those skilled in the art that many modifications may be made within the scope of the present invention without departing from the spirit thereof, and the invention includes all such modifications.

What is claimed is:

1. An apparatus for shirring sausage casings which comprises a mandrel, a movable abutment adapted to be contacted by the end of a shirred casing, a plurality of rotatable conveyor wheels mounted adjacent the mandrel and being adapted to engage a sausage casing, and a rotatable sleeve positioned about the mandrel in front of the conveyor wheels, the sleeve having a tapered section adjacent the conveyor wheels and an oblique end whereby a casing is moved between the sleeve and the mandrel, the tip of the tapered section projecting into the point of narrowest passage between the conveyor wheels.

2. An apparatus according to claim 1 in which the sleeve has a cylindrical section remote from the conveyor wheels.

3. An apparatus according to claim 1 including two conveyor wheels mounted in opposed relation relative to the mandrel.

References Cited
UNITED STATES PATENTS

| | | | |
|---|---|---|---|
| 3,231,932 | 2/1966 | Michl | 17—42 |
| 3,310,833 | 3/1967 | Clement | 17—42 |

HUGH R. CHAMBLEE, Primary Examiner

U.S. Cl. X.R.

17—41